Patented July 7, 1953

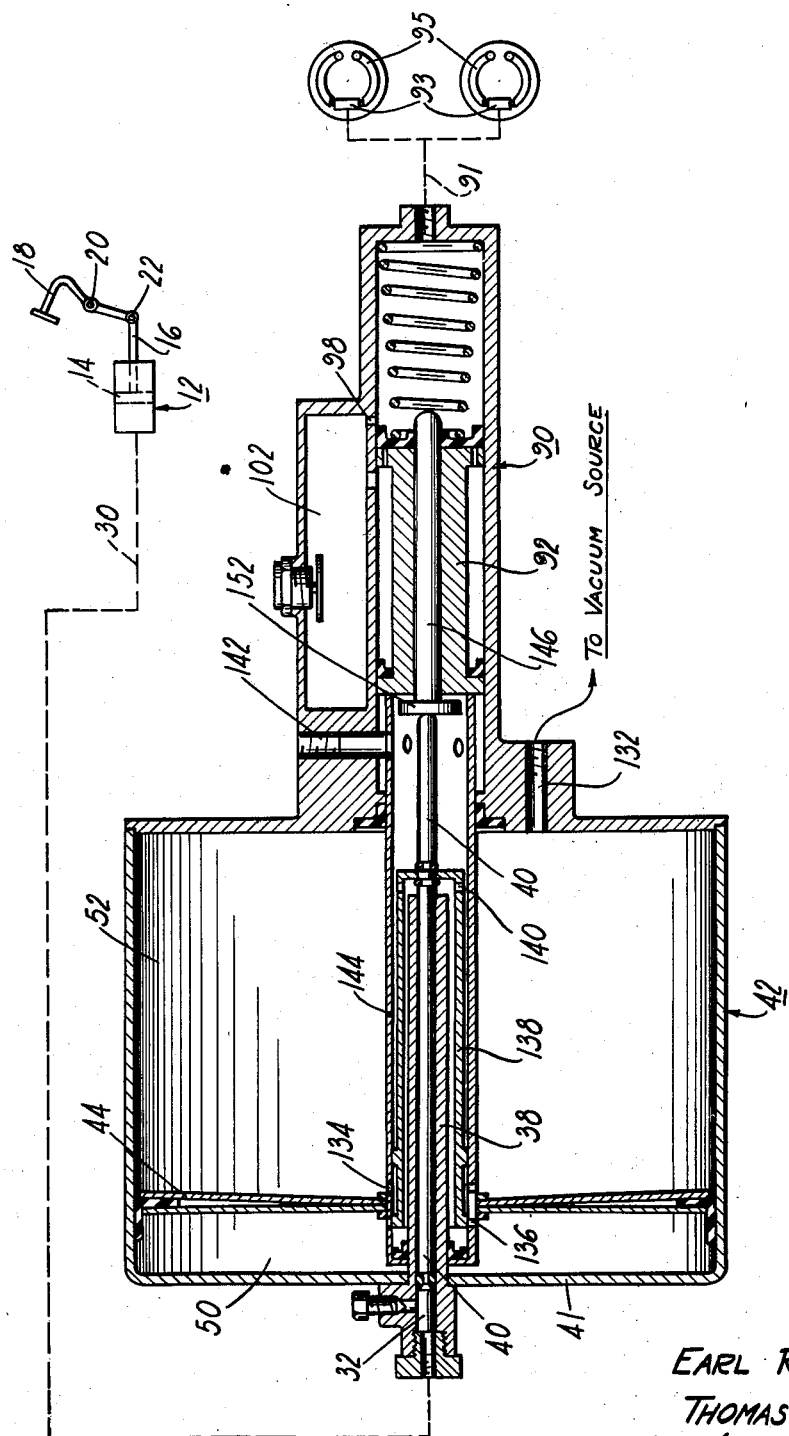

2,644,305

UNITED STATES PATENT OFFICE 2,644,305

BOOSTER UNIT FOR HYDRAULIC PRESSURE SYSTEMS

Earl R. Price and Thomas H. Thomas, South Bend, Ind., assignors to Bendix Aviation Corporation, South Bend, Ind., a corporation of Delaware Original application October 4, 1943, Serial No. 504,854, now Patent No. 2,470,748, dated May 17, 1949. Divided and this application May 3, 1949, Serial No. 91,158

10 Claims. (Cl. 60—54.5)

This invention relates to a booster unit for a hydraulic pressure system, which may be used to actuate vehicle brakes, or other pressure operated devices. This application is a division of our copending application Serial No. 504,854, filed October 4, 1943, now Patent No. 2,470,748.

In Price Patent No. 2,353,755 a hydraulic brake applying system is disclosed, wherein two master cylinders are provided, one manually operated, and the other power operated. The pressure created in the manually operated master cylinder cooperates with the power booster in creating pressure in the power operated master cylinder and additionally actuates a valve which controls the power booster. In brake applying systems of this type, the power booster, the power operated master cylinder, and the control valve for the power booster may be positioned wherever convenient on the vehicle to be braked since only fluid connections are required between these parts of the system and the remaining parts of the system. The brake applying system shown in said Patent No. 2,353,755 has both "follow-up" and "feel." This means, first, that the pedal or the like which controls the manually operated master cylinder must be moved progressively farther to increase the force of brake application, and, second, that a pressure proportional to that developed by the booster reacts against the pedal to apprise the operator of the extent of brake application.

In brake applying systems of the kind just described, it has heretofore been necessary to provide a manually operated master cylinder of sufficient liquid capacity or displacement to fully apply the brakes in case of power failure. In other words, the manually operated master cylinder had to be approximately as large as the power operated cylinder which was directly connected to the wheel, or load, cylinders or motors at the several brakes. The use of a large manually operated master cylinder has certain disadvantages; or, stating it another way, the use of a small or miniature manually operated master cylinder has several important advantages.

The primary object of the present invention is to provide, for a hydraulic system of the general type under discussion, a low displacement manually operated master cylinder, appreciably smaller than the manually operated master cylinders heretofore required.

A corollary object of the present invention is to combine a relatively low displacement manually operated master cylinder with a relatively high displacement master cylinder which is directly connected to the load cylinders and which is operater by power and manual means acting in cooperation.

A more specific object of the present invention is to provide a manually operated master cylinder for a system of the type referred to which, by virtue of its relatively small size, may be mounted with ease and simplicity in the vehicle to be braked and connected to a pedal or treadle actuating member with a minimum of complications. The low displacement of the manually operated master cylinder permits locating it in a minimum of space and requires only a short travel of the manually operable pedal or treadle, which means that a minimum of leg room is required for the operator.

Another specific object of the invention is to reduce the initial pressure losses due to friction and other causes in a hydraulic system of the type referred to. This reduction of initial pressure losses results from the substitution of a smaller manually operated master cylinder. In a master cylinder, friction of the sealing cup and the load of the return spring constitute a substantial force which must be overcome when the master cylinder is actuated. These initial pressure losses are much higher in a large master cylinder than in a small master cylinder.

A further specific object of the present invention is to provide a manual and booster operated hydraulic system which may be controlled by the operator with the maximum of efficiency. To this end it is desirable that the initial pedal pressure on the part of the driver required to operate the brakes be relatively low. On the other hand, it is desirable to have a relatively high pressure per square inch in the liquid in the master cylinder for operation of the valve which actuates or controls the power booster. If a high displacement manually operated master cylinder is used, the ratio of pressure in the master cylinder to pressure applied manually at the pedal must of necessity be relatively low, whereas, if a low displacement manually operated master cylinder is used, the ratio of pressure in the master cylinder to manual pressure on the pedal may be relatively high. This is true because the total pedal travel available is limited, and the ratio of pressure must be so planned as to permit a full stroke of the master cylinder piston before the pedal travel has run out.

A further object of the present invention is to provide a manual and power operated hydraulic system of such a nature as to permit the manufacturer of a series of vehicles to use substantially the same size manually operated master cylinder in all of such vehicles, and to vary the total brake output by varying the size of the power operated master cylinder and the booster. This permits the manually operated master cylinder and even the vehicle itself to be so designed that said manually operated master cylinder will fit satisfactorily into the space provided and will be easily lined up with the pedal or treadle.

Other objects and advantageous features of our invention will become apparent during the course of the following description, reference being had therein to the drawing, in which the figure is a part-diagrammatic, part-sectional view of a manual-and-booster-operated hydraulic system incorporating our invention.

In order to obtain the objects and advantages of our invention, we have provided a manual and booster operated hydraulic system comprising, essentially, two individual parts, one of which has a relatively low displacement and the other of which has a relatively high displacement. Another way of stating the same general thought is to say that the hydraulic means which is controlled at one end by the operator and which at the other end applies pressure to a load cylinder constitutes, in effect, two separate hydraulic systems, which have different volume-displacements. The high displacement hydraulic system includes the power operated master cylinder and the load cylinder or cylinders. The low displacement hydraulic system includes the manually operated master cylinder, and a combined motor and follow-up chamber which serves the dual purpose of: (1) actuating the booster controlling valve, and (2) acting as a variable volume chamber which increases in volume as the booster operated master cylinder piston moves, and which adds manual pressure to the booster created pressure acting on the booster operated master cylinder piston. We thus make it possible to obtain a greater fluid volume output from the booster operated master cylinder than has heretofore been possible, presupposing a given size manually operated master cylinder.

Referring to the figure, a small, low displacement master cylinder 12 is provided with a piston 14 reciprocable therein which is mechanically connected by means of a rod 16 to a manually operable member, such as a pedal 18 pivoted on a fixed vehicle part at 20, and pivotally connected to the rod 16 at 22. The master cylinder bore is connected by means of the conventional recuperation and supply ports (not shown) with a liquid reservoir. The discharge end of the master cylinder bore is connected by means of a conduit 30 with a combined motor and follow-up chamber 32, which constitutes the output portion of the low displacement system.

The hydraulic master cylinder 12 and the combined motor and follow-up chamber 32, together with conduit 30, constitute an individual hydraulic system. This hydraulic system has a relatively low liquid volume displacement, i. e., a relatively small amount of liquid is displaced during the stroke of the piston 14 in master cylinder 12. Losses of liquid in the system are compensated for, and development of vacuum in the system on the piston return stroke is prevented, by means of the ports connecting the bore of the master cylinder 12 directly to its compensating reservoir (not shown).

Follow-up chamber 32 is defined by a tube 38 and a piston 40 reciprocable in the tube. Tube 38 is mounted on the rear wall 41 of power cylinder 42, and extends into the interior of the power cylinder through an opening in the center of power cylinder piston 44. Hydraulically operated piston 40 acts as a motor which actuates the power cylinder control valve and which adds the effort exerted by master cylinder 12 to that exerted by the power cylinder piston. The term "power cylinder," as used herein, is intended to include all boosters having a pressure responsive movable wall therein, whether of the diaphragm type, or of the piston type. The term "piston," as used in the claims, is intended to include any pressure-responsive movable wall, whether of the solid type, or of the flexible diaphragm type.

Piston 40, which is urged toward the right by the pressure of liquid in follow-up chamber 32, serves as the actuating means for slide valve 138, which in turn controls operation of the power cylinder. In the released position of the valve and power cylinder, piston 44 of the power cylinder is submerged in vacuum. The port 132, which opens into chamber 52 of the power cylinder, is connected to a source of vacuum, and chamber 50 at the opposite side of piston 44 is in communication with chamber 52 via ports 134 and 136. In the illustrated position of the valve, ports 136 are covered by the valve, and the valve is therefore in "lapped" position. Further movement of slide valve 138 toward the right brings the left-hand side of the power cylinder piston into communication with the atmosphere through ports 136, 140, and 142. When air enters chamber 50 of the power cylinder, the differential between pressures on opposite sides of the power cylinder piston causes said piston to move toward the right, pushing through a tubular rod 144 against piston 92 in power operated master cylinder 90.

Power operated master cylinder 90 is part of the high displacement hydraulic system which is connected by means of a conduit 91 to the load cylinders 93, which apply the brakes 95, or accomplish other desired functions. Master cylinder 90 is appreciably larger in displacement than master cylinder 12. This difference in volume may be provided by a difference in diameters of the master cylinder bores, or by a difference in the length of stroke. Compensation for volumetric changes of the liquid in the large displacement hydraulic system is accomplished through a port 98 in the master cylinder wall which connects the chamber in front of piston 92 to hydraulic reservoir 102.

The right end of piston 40 is in engagement with the rear of a plunger 146, which reciprocates in a bore provided in the center of piston 92, and which has its front end extending into the chamber which lies at the front of piston 92. Thus, pressure created manually against piston 40 tends to increase the pressure at the wheel, or load, cylinders. Furthermore, as the power cylinder raises the pressure at the wheel cylinders, the increased pressure ahead of piston 92 reacts against the manually operated pedal through plunger 146, piston 40, and the liquid in follow-up chamber 32. As the power cylinder piston 44 moves on the brake applying stroke, it follows slide valve 138, thus tending first to lap the valve, and then to bring the valve to released position. If the piston 40 is not moved further in a valve opening direction by further depression of the manually controlled pedal, the progressive increase in brake applying force of the power cylinder will cease. Thus, the brake system incorporates "follow-up."

This displacement of manually operated master cylinder 12 need only be sufficient to handle the displacement of follow-up chamber 32. The power operated master cylinder 90 must have a displacement adequate to match the required displacement of the load cylinder, or cylinders 93.

Because of the low displacement of the manually operated hydraulic system, this system becomes, relatively speaking, a high pressure system. That is, assuming that a given displacement is necessary at the load cylinders, our invention permits the manually operated hydraulic system to be operated at a pressure much higher than has heretofore been possible. This is true because the low displacement of the manually operated hydraulic system permits a high ratio of pressure in the master cylinder 12 to pressure exerted by the operator on the pedal. On the other hand, the hydraulic system which includes the master cylinder 90 may be considered as a relatively low pressure system, in the sense that it operates at a lower pressure and higher displacement, assuming a given displacement of the manually operated master cylinder, than has heretofore been possible.

Use of a small, high pressure manually operated master cylinder has definite advantages. In addition to the space-saving advantage resulting from the smallness of the master cylinder, use of a relatively small master cylinder makes it possible for the pedal to act on the master cylinder at a relatively high mechanical advantage. This means that the operator has a greater mechanical advantage available in overcoming the initial resistance of the master cylinder brought about by the friction of its piston and by the force of the return spring in the master cylinder.

The booster unit, which includes power cylinder 42 and master cylinder 90, may be so designed as to obtain any desired relationship between the pressure per square inch developed in master cylinder 90 corresponding to a given pressure per square inch developed in master cylinder 12 and chamber 32. In the illustrated embodiment of the invention, plunger 146 is shown as having a larger diameter than piston 40. This means that, in the particular embodiment shown, the unit pressure in the high displacement system is less than the unit pressure in the low displacement system. This, of course, does not have to be the case. The unit pressure in the low displacement system may be less than the unit pressure in the high displacement system, or the unit pressures may be the same. The entire arrangement, including both low displacement and high displacement hydraulic systems, together with the booster, is a work multiplying unit, and it may or may not be a pressure multiplying unit. While the relative pressures per square inch in the large and small master cylinders may be varied according to design, the work accomplished at the load cylinder, or cylinders, is greater than that accomplished at the manually operated master cylinder 12, owing to the combination of power and manual work accomplishing means.

Piston 40 and plunger 146 may, if desired, be combined as a single plunger element in the booster assembly. Also, if desired, piston 92 and tubular rod 144 may be constituted by a single tubular element.

It is important that the brake applying unit be operable to apply the brakes manually in case of power failure. If the power cylinder fails to operate promptly, piston 40 will continue to move toward the right until the head 152 formed on plunger 146 engages the rear of piston 92. When this happens, the manually developed pressure in chamber 32 will directly actuate piston 92 to apply the brakes. Obviously, the manual force required will be much greater than it would be under normal circumstances. However, at least it will be possible to apply the brakes within the range of available pedal travel.

In case of power failure, it is important that insurance be provided against passage of liquid from the low displacement hydraulic system to the high displacement system. This is guaranteed in the disclosed design by the complete mechanical disassociation of the two systems. Compensation for volumetric changes of the fluid in the high displacement system is accomplished independently of the low displacement system. In the illustrated embodiment of the invention, the high displacement system has its own reservoir 102. However, it would be possible to use a single reservoir for both the low displacement and the high displacement systems without endangering proper operation of the booster unit.

Although a single embodiment of the invention has been illustrated and described, it will be obvious that various modifications can be made to suit requirements.

We claim:

1. A manual and booster brake device comprising a casing which reciprocably carries a differential air pressure power piston, a tubular thrust transmitting member coaxially secured to said piston and carrying a valve opening on each side of said piston, a valve member reciprocably received inside said tubular member to control said openings, a second tubular member secured to the end wall of said casing to coaxially project into said valve member, a relatively long hydraulic piston reciprocably carried inside said second tubular member and operatively connected to said valve member, a hydraulic master cylinder having a piston engageable by said thrust transmitting member, and a reciprocable fluid pressure responsive plunger in said master cylinder piston engageable with one end of said relatively long piston and acted upon by the fluid pressure in said master cylinder, said hydraulic pistons having independent hydraulic systems.

2. A manual and booster brake device comprising a differential fluid pressure power piston which separates a pair of fluid chambers, a tubular thrust transmitting member coaxially secured to said piston and carrying valve elements on each side of said piston, a valve member slidably received by said thrust transmitting member to cooperate with said valve elements, a second tubular member extending into said valve member, a hydraulically operable piston reciprocably received by said second tubular member and operatively connected to said valve member, a master cylinder having a piston engageable by said thrust transmitting member, a reciprocable fluid pressure responsive plunger carried by said master cylinder piston and engageable with one end of said hydraulically operable piston, said plunger being subjected to the fluid pressure in said master cylinder, said master cylinder piston and said hydraulically operable piston being disposed intermediate separate hydraulic pressures.

3. A manually operated power braking device comprising a casing, a piston reciprocable in said casing and defining two variable volume chambers, a tubular thrust transmitting member secured between its ends to said piston and having valve openings on each side of said piston, a cylindrical valve member slidably received inside said thrust transmitting member and adapted to control communication between said openings and the communication of vacuum and air pressure to one of said chambers, a second tubular member secured to said casing and extending inside said cylindrical valve member, said thrust transmitting member having a portion which slidably engages in fluid-tight relation the outer peripheral surface of said second tubular member, a fluid pressure responsive element reciprocably received by said second tubular member and adapted to be acted upon by fluid pressure injected into one end of said second tubular member, said element having a connection with said valve member, a master cylinder having a piston engageable on one end by said thrust transmitting member and adapted to act at its other end against a quantity of fluid, and a plunger reciprocably mounted in said master cylinder piston and having engagement with said element, said plunger being arranged to be acted upon by the same unit fluid pressure which acts against said other end of said master cylinder piston, said element and said master cylinder piston being exposed to separated fluid pressures.

4. A manually operated power braking device comprising a casing, a piston reciprocable in said casing and defining two variable volume chambers, a tubular thrust transmitting member secured between its ends to said piston and having valve openings on each side of said piston, a cylindrical valve member slidably received inside said thrust transmitting member and adapted to control communication between said openings and the communication of vacuum and air pressure to one of said chambers, a second tubular member secured to said casing and extending inside said cylindrical valve member, a fluid pressure responsive element reciprocably received by said second tubular member and adapted to be acted upon by fluid pressure injected into one end of said second tubular member, said element having a connection with said valve member, a master cylinder having a piston engageable on one end by said thrust transmitting member and adapted to act at its other end against a quantity of fluid, and a plunger reciprocably mounted in said master cylinder piston and having engagement with said element, said plunger being arranged to be acted upon by the same unit fluid pressure which acts against said other end of said master cylinder piston, said element and said master cylinder piston being exposed to separated fluid pressures.

5. A manually operated power braking device comprising a casing, a piston reciprocable in said casing and defining two variable volume chambers, a tubular thrust transmitting member secured between its ends to said piston and having valve openings on each side of said piston, a cylindrical valve member slidably received inside said thrust transmitting member and adapted to control communication between said openings and the communication of vacuum and air pressure to one of said chambers, a second tubular member secured to said casing and extending inside said cylindrical valve member, a fluid pressure responsive element reciprocably received by said second tubular member and adapted to be acted upon by fluid pressure injected into one end of said second tubular member, said element having a connection with said valve member, and a master cylinder having a piston engageable on one end by said thrust transmitting member and adapted to act at its other end against a quantity of fluid, said element operatively and reciprocably extending through said master cylinder piston whereby a portion thereof is exposed to the same unit fluid pressure which acts against said other end of said master cylinder piston, said element and said master cylinder piston being exposed to separated fluid pressures.

6. A manually operated power braking device comprising a casing, a piston reciprocable in said casing and defining two variable volume chambers, a tubular thrust transmitting member secured between its ends to said piston and having valve openings on each side of said piston, a cylindrical valve member slidably received inside said thrust transmitting member and adapted to control communication between said openings and the communication of vacuum and air pressure to one of said chambers, a second tubular member secured to said casing and extending inside said cylindrical valve member, a fluid pressure responsive element reciprocably received by said second tubular member and adapted to be acted upon by fluid pressure injected into one end of said second tubular member, said element having a connection with said valve member, and a master cylinder having a piston engageable on one end by said thrust transmitting member and adapted to act at its other end against a quantity of fluid, said element being arranged to be acted upon by the unit fluid pressure created at said other end of said master cylinder piston.

7. A manually operated power braking device comprising a casing, a piston reciprocable in said casing and defining two variable volume chambers, a tubular thrust transmitting member secured to said piston and having valve openings on each side of said piston, a valve member received inside said thrust transmitting member and adapted to control communication between said openings, a second tubular member secured to said casing and projecting into said valve member, a fluid pressure responsive element reciprocably mounted in said second tubular member and being operatively connected to said valve member, a master cylinder having a piston engageable by said thrust transmitting member, and a plunger reciprocably mounted in said master cylinder piston and having engagement with said element, said plunger being arranged to be responsive to the same unit fluid pressure which acts on the face of said master cylinder piston.

8. A manually operated power braking device comprising a casing, a piston reciprocable in said casing and defining two variable volume chambers, a tubular thrust transmitting member secured to said piston and having valve openings on each side of said piston, a valve member received inside said thrust transmitting member and adapted to control communication between said openings, a second tubular member projecting into said valve member, a fluid pressure responsive element reciprocably mounted in said second tubular member and being operatively connected to said valve member, a master cylinder having a piston engageable by said thrust transmitting member, and a plunger reciprocably mounted in said master cylinder piston and having engagement with said element, said plunger being arranged to be responsive to the same unit fluid pressure which acts on the face of said master cylinder piston.

9. A manually operated power braking device comprising a casing, a piston reciprocable in said casing and defining two variable volume chambers, a tubular thrust transmitting member secured to said piston and having valve openings on each side of said piston, a valve member received inside said thrust transmitting member and adapted to control communication between said openings, a second tubular member projecting into said valve member, a fluid pressure responsive element reciprocably mounted in said second tubular member and being operatively connected to said valve member, and a master cylinder having a piston engageable by said thrust transmitting member, said element being responsive to the same unit fluid pressure which acts on the face of said master cylinder piston.

10. A manually operable power braking device comprising booster means, a hollow valve member movable relative to said booster means arranged to control actuation of the booster means, a master cylinder having a power-operated piston reciprocable therein to displace fluid therefrom, said piston being operatively connected to said booster means, a manually operable fluid pressure-responsive element projecting through said hollow valve member and arranged to actuate the latter, and means communicating the unit fluid pressure created by displacement of fluid in said master cylinder to said element in opposition to the force of the fluid pressure tending to displace the latter.

EARL R. PRICE.
THOMAS H. THOMAS.

References Cited in the file of this patent

UNITED STATES PATENTS

| Number | Name | Date |
| --- | --- | --- |
| 2,260,491 | Stelzer | Oct. 28, 1941 |
| 2,322,063 | Schnell | June 15, 1943 |
| 2,352,357 | Almond | June 27, 1944 |
| 2,365,471 | Ingres | Dec. 19, 1944 |
| 2,468,706 | Price | Apr. 26, 1949 |
| 2,517,005 | MacDuff | Aug. 1, 1950 |